United States Patent [19]

Lanahan et al.

[11] 3,974,361

[45] Aug. 10, 1976

[54] INFORMATION STORAGE CARD WITH CODED VERTICAL EDGE

[75] Inventors: John H. Lanahan, Whitesboro; William W. Abraham, Utica, both of N.Y.

[73] Assignee: GAF Corporation, New York, N.Y.

[22] Filed: Dec. 23, 1974

[21] Appl. No.: 536,873

Related U.S. Application Data

[62] Division of Ser. No. 420,587, Nov. 30, 1973.

[52] U.S. Cl. .......................... 235/61.12 R; 209/80.5
[51] Int. Cl.² ..................... G06K 21/00; B07C 5/38
[58] Field of Search ............ 235/61.12 R; 209/80.5, 209/110.5

[56] References Cited
UNITED STATES PATENTS

| | | | |
|---|---|---|---|
| 3,446,945 | 5/1969 | Robinson | 235/61.12 R |
| 3,555,248 | 1/1971 | Irasek et al. | 235/61.12 R |
| 3,608,714 | 9/1971 | Cox | 235/61.12 R |

*Primary Examiner*—Daryl W. Cook
*Attorney, Agent, or Firm*—Walter C. Kehm; Arthur Dresner

[57] ABSTRACT

This invention is directed to an information storage card having a vertical rear edge with a series of coded notches for identification and selection. When the card is carried in a pack of similar cards the rear vertical edge of each card is aligned so that the notch coded edge of each card is similarly positioned for selection. Accordingly, the selection means of an appropriate card sorting apparatus will be provided with code bars to engage the aligned vertical edges of the cards to distinguish certain selected cards from the remaining cards of the pack. A further notch is also provided in the top of each card which is defined by a vertically extending abutment edge intended to be engaged by means on the apparatus to prevent forward movement of that card. Yet, a further notch is positioned in the rear lower corner of the card at the bottom of the vertical rear edge and is defined by a downwardly facing horizontal edge extending from said vertical rear edge of the card inwardly and adapted to be engaged by additional means of the apparatus for raising the card in order to effect separation between the selected card and the remaining cards of the pack.

1 Claim, 12 Drawing Figures

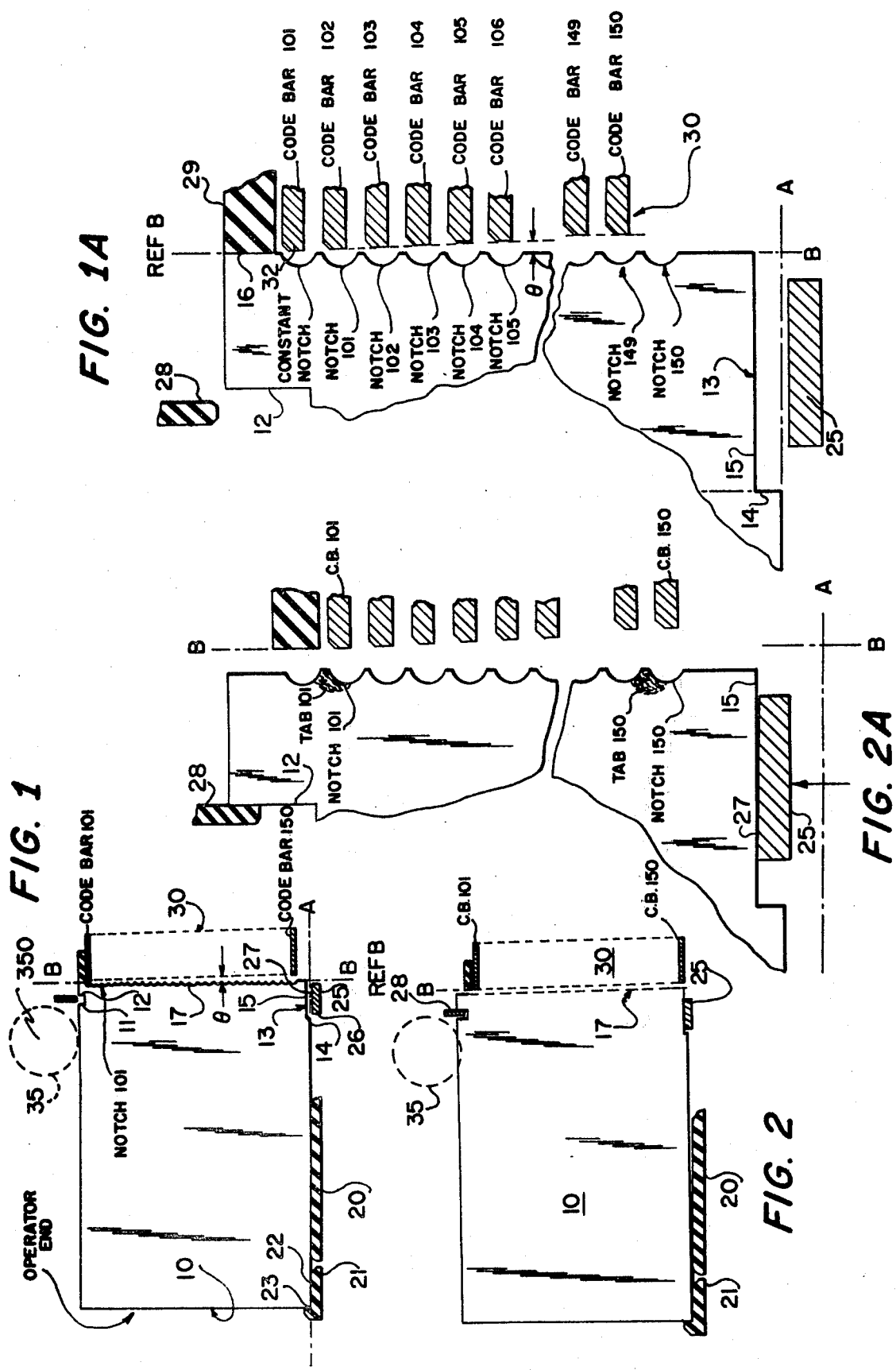

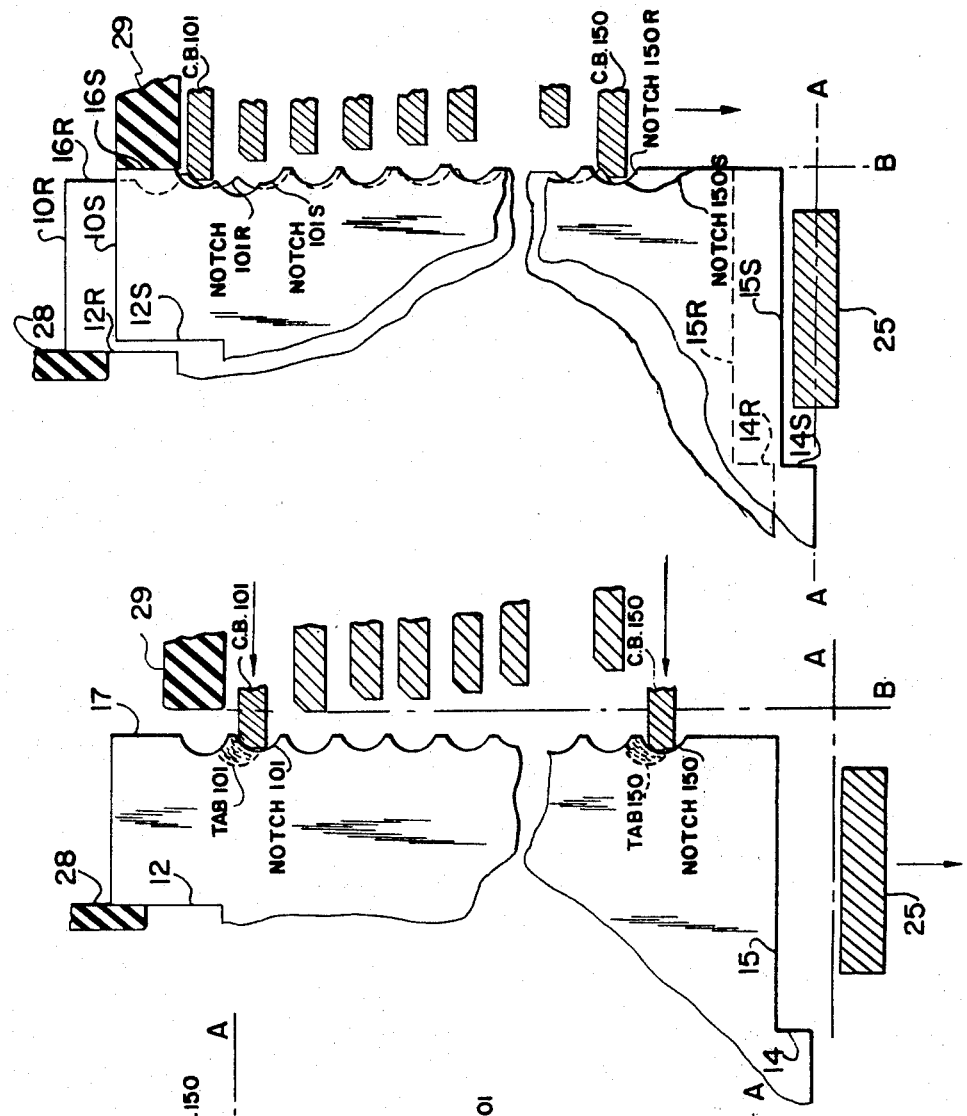

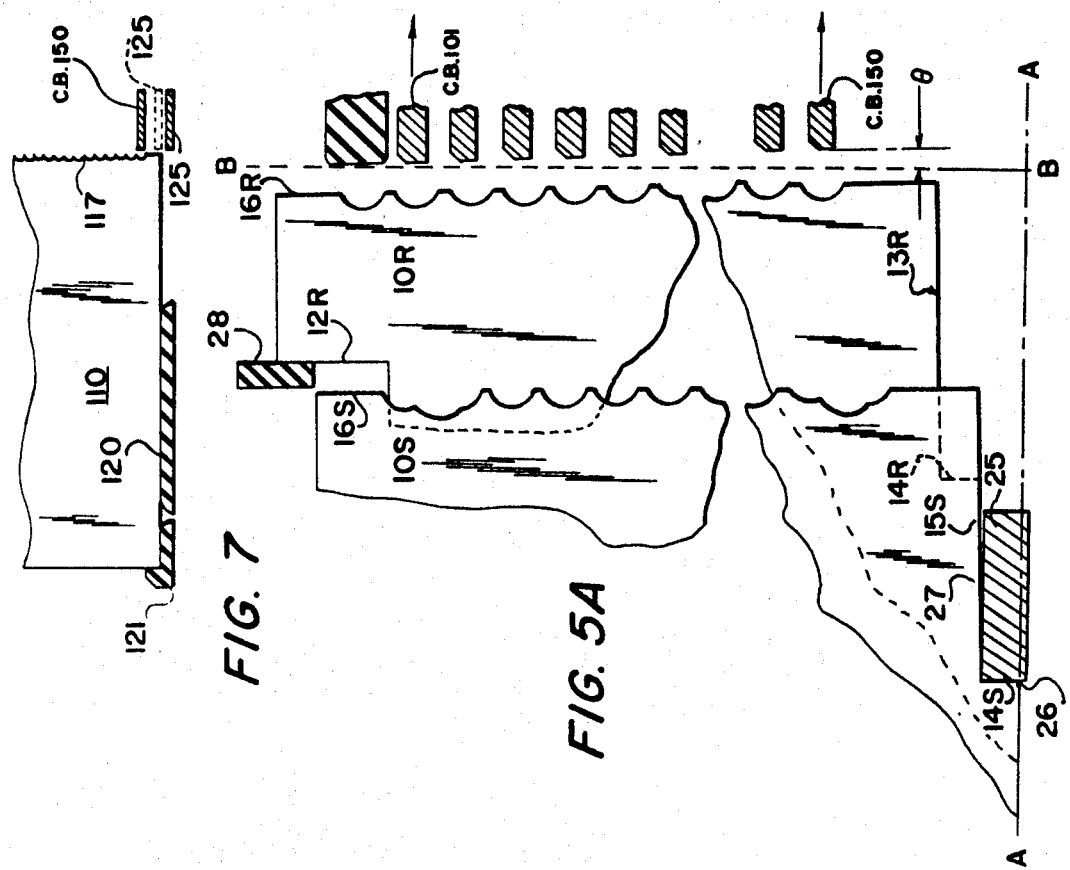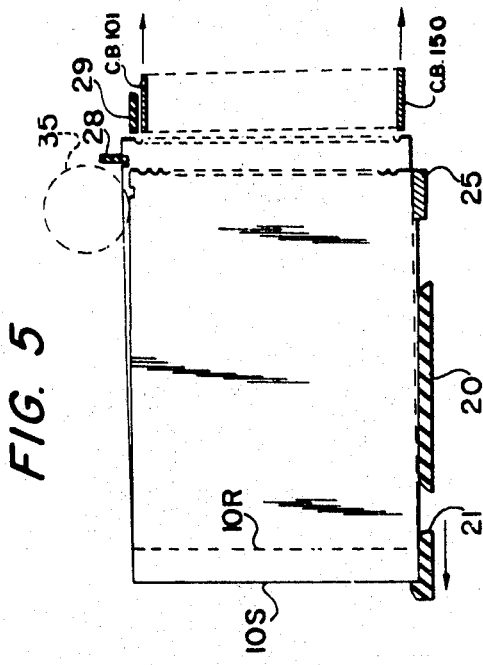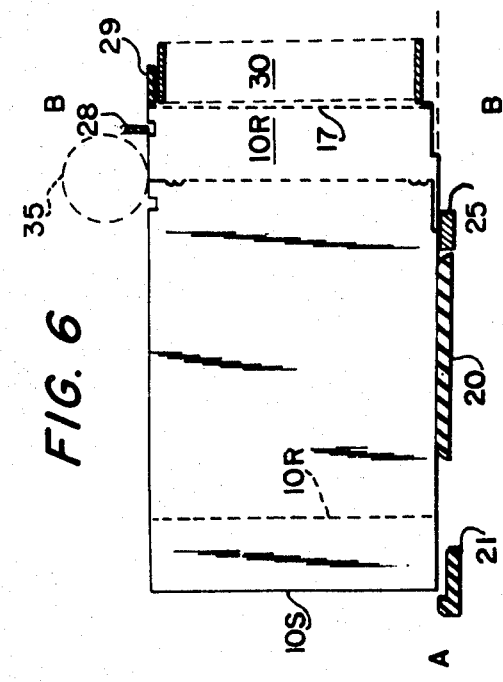

INFORMATION STORAGE CARD WITH CODED VERTICAL EDGE

This is a division of application Ser. No. 420,587, filed Nov. 30, 1973.

BACKGROUND OF THE INVENTION

This invention relates to card sorting, and in particular it relates to a new and proved method and apparatus and a new information card wherein the code such as edge notches are placed on a vertical edge of the card.

Numerous arrangements are presently known for sorting cards which are provided along their edges with information bearing means such as edge notches. Previous devices utilize a plurality of selectively operable code bars spaced along bottom of the device and cooperating with notches located along the bottom edge of the cards. One type of previous device which utilizes notches placed at selected locations along the bottom of the card is shown in our earlier U.S. Pat. No. 3,586,166. Another type of device which removes tabs from between adjacent notches of a prearranged regular pattern of notches, also located along the bottom of the card, is shown in the Whitson U.S. Pat. No. 2,397,943.

While these bottom notched cards have proved relatively successful, they have suffered from a number of disadvantages. Firstly, they have tended to be relatively complex. The basic operation of moving cards and/or code bars vertically, especially when coupled with the required horizontal movement to finally separate the selected cards from the remaining cards, requires a relatively large number of steps and this in turn complicates the apparatus for carrying out such steps.

Secondly, the cost of such an apparatus is increased by the requirement for a high level of precision. The basic reason for requiring this precision is that in any such bottom edge notch card system, there must be a step wherein there is relative vertical movement between the selected cards and the non-selected cards. Because of friction between the cards, this task of effecting relative vertical movement between the two groups of cards is perhaps one of the most difficult of all tasks to complete with 100 percent efficiency. If it is not completed with such efficiency, then it will be appreciated that the sorting task may not be completely satisfied since a selected card might remain with the other cards or vice versa. The difficulty arises when this difficult vertical separation step is carried out when at least one of the groups of cards, i.e. selected or nonselected, are either on the selected code bars or are moving downwardly onto selected code bars. Obviously any lateral movement at this point could not only reduce the efficiency of the overall separating operation but indeed it might even cause damage to the cards or jamming of the machine.

Another disadvantage is the fact that it is at best inconvenient to locate the code bars at the bottom of the device. Current consumer orientation requires or at least strongly dictates a low profile. Therefore, although the code bars are located along the bottom of the device, it would not be practical to also locate at the bottom of the device all of the supporting equipment. Rather, it is necessary to further complicate the machine by complicating linkages or the like linking the code bars to operating mechanisms located elsewhere such as behind the cards.

Most of the above disadvantages are applicable, which ever of the two types of systems of bottom edge notched cards are utilized. However, the system utilizing the prearranged regular pattern of notches with certain tabs removed from between adjacent notches suffers from the additional disadvantage that the cards themselves must be further complicated by magnetic means or the like for effecting lateral separation of the selected cards relative to the non-selected cards.

Thus, there exists a need for a new and improved card sorting method and apparatus which will overcome the disadvantages of presently known arrangements.

SUMMARY OF THE INVENTION

Thus, it is the purpose of the present invention to provide a new and improved card sorting system which will overcome the disadvantages of previous known arrangements.

This purpose of the present invention is achieved by providing an information card with the information bearing indicia such as edge notches or the like located on a vertical edge of the cards. In cooperation therewith, the present invention further includes a method and apparatus for separating selected cards from the remaining cards of a pack. This is accomplished by arranging the cards with the information bearing vertical edges thereof in alignment with each other whereupon a selecting means is activated in cooperation with the said information bearing vertical edges so as to retain in position one of the two groups of cards, i.e. the selected group or the non-selected group, whereby the other group can be moved vertically relative to the first group to effect separation thereof.

In accordance with a preferred method and apparatus of the present invention, the cards include notches along the said vertical edge and a plurality of code bars are arranged vertically along this edge, i.e. for horizontal movement to cooperate with these notches. This arrangement vastly simplifies the overall apparatus in many respects. Firstly, since the number of relative vertical movements between the cards and the code bars are reduced, the overall operation is vastly simplified. Secondly, since the code bars are arranged vertically for horizontal movement, they may be located in the back of the apparatus rather than along the bottom thereof. Consequently, they can be placed immediately adjacent their operating means thereby greatly simplifying the overall apparatus. Moreover, the requirement for absolute precision and the possibility of damaging the cards are greatly reduced. Firstly, the above described difficult step of effecting vertical movement onto vertically movable code bars is no longer present. Secondly, the final step of moving the selected cards out to be grasped involves moving the cards away from the code bars, not transversely thereacross.

In accordance with a preferred method and apparatus of the present invention, the cards are provided with a plurality of evenly spaced notches along the vertical edge thereof, a code bar being provided for each notch position, and tabs between adjacent notches are removed to impart coded information to a given card. It will be understood that if a given tab is removed and the only selector bar moved outwardly is the one which moves into the notch beneath the removed tab then clearly there will be a tendency for that card to fall downwardly a distance of one notch in comparison with another card which still has that tab since the tab would engage the extended code bar. In accordance with the preferred operation of this embodiment, the pack of cards are arranged at a reference level from which they are raised a distance of one notch. At this time, the selected code bars are extended. Means are then actuated to effectively remove the friction from between the cards so that the selected cards with the tab above the notch of the extended code bar removed can move downwardly relative to the remaining cards. A means is then provided for engaging the bottom of the selected cards and moving them horizontally away from the remaining cards which are held against such horizontal movement by a means which engages the non-selected cards adjacent the upper edges thereof. Unlike the arrangements in the prior art utilizing regular patterns of notches along the bottom of the cards, in the present invention there is no need to provide additional means such as magnets or the like for effecting the first basic movement of the selected cards relative to the non-selected cards since this is accomplished by gravity.

Thus, it is an object of the present invention to provide a new and improved information card having information bearing means such as notches or the like along a vertical edge thereof.

It is another object of this invention to provide a method and apparatus for sorting cards wherein the cards are provided with information along vertical edges thereof.

It is still another object of this invention to provide a new and improved card sorting method and apparatus using edge notched cards wherein the notches are provided along the vertical edges of the cards.

It is another object of this invention to provide a new and improved method and apparatus wherein a plurality of evenly spaced notches are provided along the vertical edges of the cards and selected information is imparted to the cards by removing certain of the tabs between adjacent notches.

It is another object of this invention to provide a new and improved card sorting method and apparatus of the type having edge notched cards wherein the notches are provided along a vertical edge of the cards and selector bars are arranged along this edge, the bars arranged vertically so as to project horizontally into the notches.

It is another object of this invention to provide a new and improved card sorting apparatus which can be greatly simplified by virtue of the fact that the code bars are located in the rear of the apparatus rather than along the bottom thereof.

It is another object of this invention to provide a new and improved apparatus wherein information bearing cards and held at a reference position and then moved upwardly at which point selecting means such as code bars select certain of the cards after which vertical relative movement is effected between the selected and non-selected cards.

Other objects and the advantages of the present invention will become apparent from the detailed description to follow, together with the accompanying drawings.

BRIEF SUMMARY OF THE DRAWINGS

There follows a detailed description of a preferred embodiment of the invention to be read together with the accompanying drawings wherein:

FIG. 1 is a schematic view illustrating an information card having the features of the present invention and showing schematically the portions of an apparatus which would be utilized to select certain of these cards.

FIG. 1A is an enlarged view of a portion of FIG. 1.

FIGS. 2, 3, 4, 5 and 6 are schematic views of the card and the apparatus similar to FIG. 1 but showing the cards and the apparatus in different operative positions.

FIGS. 2A, 3A, 4A, and 5A are enlarged views of portions of FIGS. 2, 3, 4 and 5, respectively.

FIG. 7 is a schematic view similar to FIG. 2 but showing a modification of the invention.

DETAILED DESCRIPTION OF THE PREFERRED EMBODIMENTS

Referring now to the drawings, like elements are represented by like numerals throughout the several views.

Referring now to FIGS. 1 and 1A, the cards 10 include an upper notch 11 having a back edge 12. The card includes an abutment edge 16 at the upper rear corner thereof. At the lower rear corner thereof there is provided a notch 13 having a front edge 14 which faces rearwardly and an upper edge 15. In this embodiment the card includes a bank of notches indicated generally at 17 located along the rear vertical edge thereof.

The apparatus illustrated schematically in the drawings which would be provided for operating on these cards includes a fixed rest platform 20 and a front rail 21. This rail includes a horizontal surface 22 which forms a corner with a vertical forward surface 23. Note the reference line A—A which will be utilized below to describe the operation of the invention. At the present it will be noted that this rail 21 would be arranged for movement horizontally out to the left as shown in FIG. 1 and also downwardly relative to the position shown in FIG. 1. At the rear bottom of the apparatus there is provided an ejecting rail or bar 25 having a front face 26 and a top 27. In a manner to be described below, the top surface 27 cooperates with the edge 15 of notch 13 to raise the cards at the appropriate time in the cycle of operation while the front face 26 engages edges 14 of certain cards at the appropriate time for moving those cards forwardly, i.e. to the left as shown in FIG. 1. Thus, it will be understood that this bar 27 is capable of movement upwardly and to the left of the position as shown in FIG. 1.

At the upper portion of the apparatus there is provided a lockout rail 28 and an index rail 29. Both of these rails extend transversely across all of the cards and they are fixed in the illustrated positions. The purpose of these rails will become apparent from the following description. The apparatus also includes a brush indicated diagrammatically at 35 which rotates about an axis 350. At the appropriate time this brush is rotated for reducing friction between the cards so that relative vertical movement between the selected and the non-selected cards can be effected.

The bank of notches 17 includes one notch for each code bar plus one additional notch which is referred to as the "constant notch" which is located above the upper notch having associated therewith a code bar. The bank of code bars 30 thus includes one code bar for each of the notches except the uppermost notch. To simplify explaining the structure and operation of the invention, each of the operative notches, of which there are 50 in the present example have been given numbers 101 through 150 while the tab associated with each notch and the code bar associated with each notch have been given the same number, i.e. there are tabs 101 through 150 and code bars 101 through 150. (Although the code bars are spaced vertically from their respective notches in FIGS. 1 and 1A, the cards will subsequently be raised by an amount equal to the distance between two adjacent notch centers so that at the time of selection each code bar will face its respective notch).

While the apparatus is shown only schematically, there is a sufficient description for one skilled in this art, utilizing the teachings of the present disclosure, to make and use such an apparatus. This is true partly because of the fact that certain elements are known in the prior art (as will be described immediately below) and also because the present apparatus is so vastly simplified relative to previous known apparatus for sorting edge notched cards. For example, it will first of all be noted that the elements 20, 28 and 29 are fixed in place. Thus, these are simply rails, bars or the like extending for the full width of the apparatus (the width being defined as the direction perpendicular to the plane of the drawings). Means for effecting both horizontal and vertical movement of the rails 21 and 25 would be relatively simple, but in any event means for raising and lowering such rails are shown in our said previous U.S. Pat. No. 3,586,166. Also shown in our said earlier patent is a solenoid arrangement for operating individually each of these code bars. However, in the present apparatus the means for operating these code bars would be even more simplified. As noted above, the overall apparatus is greatly simplified because the code bars are located at the rear of the machine rather than along the bottom thereof. Consequently, the individual code bars may be connected even more directly to their respective solenoids than as shown in our said previous patent. Another patent illustrating means for raising and lowering bars and also moving individual code bars is the Cross U.S. Pat. No. 3,292,631. The brush 35 is also described in our earlier U.S. Pat. No. 3,586,166, although an improvement thereof is further described in our previous U.S. Pat. No. 3,718,255, issued Feb. 27, 1973.

The operation of the invention is as follows:

FIG. 1 illustrates the cards in the storage or rest position.

The apparatus can be of any width. For example it may be only several inches wide or it can extend for several feet. Further, depending on the number of cards in the system, the cards can either be stored directly in the machine or in batches separate from the machine and inserted into the machine from the left-hand end thereof, as shown in FIG. 1, at the time of use. In either event, immediately prior to use, the pack of cards from which the selected cards are to be removed, is placed into the machine as shown FIG. 1. In this rest position the bottom of the cards rest on the upper surface of rail 21 and on fixed rest platform 20. In this position the bottoms of the cards lie along a reference line AA. The cards are further supported by engagement of the upper rear abutment edges 16 against fixed rail 29. As best illustrated in FIG. 1A, in this position a line touching the lefthand end of all code bars forms a slight angle θ with a line touching the outer edge of all tabs 101–150. This reference line is illustrated as the line B—B in the figures.

FIG. 2 now illustrates the first operating step. As illustrated therein the rail 25 is moved upwardly, the upper surface 27 thereof engaging the edges 15 of notches 13 of all cards and moving all cards upwardly the distance between the center points of two adjacent notches, at which point the cards 10 are moved away from the rail 29 and the edge 12 of notch 11 is moved against the fixed rail 28. In this position each notch is directly across from its respective code bar.

In the present example of the operation of the invention, code bars 101 and 150 will be extended to the left. Note in FIG. 2A the shaded areas representing tabs 101 and 150. Cards having these two tabs removed will then not be held by the code bars 101 and 150 but will potentially be movable downwardly relative to the remaining cards which have at least one of these tabs 101 and 150 in place, since in such remaining cards at least one of these tabs will engage its respective code bar which will prevent downward movement of that card.

In FIG. 3 the two code bars 101 and 150 have now been extended and the rail 25 has been lowered. Note also that these code bars 101 and 150 not only retain cards having at least one of the tabs 101 and 150 but also they maintain the edge 12 of these cards against the fixed lockout rail 28. It will be appreciated that theoretically, with the elements as shown in FIGS. 3 and 3A, the selected card with the tabs 101 and 150 removed are "freed" to move downwardly. Actually, they would so move except for the frictional engagement between adjacent cards. To overcome this friction the brush 35 is operated whereupon the selected cards with these two tabs removed do in fact move downwardly as shown in FIGS. 4 and 4A. In these figures and in the subsequent figures the elements 10 through 16 will be followed by the letter S or R to represent the selected or rejected cards, respectively. It will also be noted that the code bars include outer upper chamferred surfaces 32 to increase the area of contact between the code bars and their respective notches.

Referring now to FIGS. 4 and 4A, it will be seen that the rejected cards 10R are in precisely the same position as in FIGS. 3 and 3A while the selected cards have moved downwardly relative thereto, preferably back to the position of FIG. 1 with the bottom edge thereof lying along line A—A.

Referring now to FIGS. 5 and 5A, the eject rail 25 is now moved to the left whereby its front face 26 engages edges 14S of the selected cards 10S urging them to the left, this rail 25 passing beneath the rejected cards 10R and in particular beneath the edge 14R of the rejected cards. During this movement, however, the upper surface 27 of the rail 25 engages the bottom of the rejected cards 10R, holding the same elevated so that the edges 12R engage the fixed rail 28 so that at this time the code bars 101 and 150 can be relieved of this function and can therefore move to their retracted positions.

After the leftward movement of cards 10S has been completed the rails 25 and 21 drop downwardly as shown in FIG. 6 thereby permitting removal to the left of the selected cards 10S and a dropping motion of the rejected cards 10R back onto the platform 20 and against the rail 29. Finally, the rail 21 is raised back to its position as shown in FIG. 5 and moved rearwardly restoring any non-removed selected cards 10S back to their original position. Simultaneously, rail 25 is moved rearwardly to the position of FIG. 1 whereupon the original index position of FIG. 1 has now been reached. This completes the cycle of operation.

The preferred embodiment, as discussed above, has included a notch 13 having vertical and horizontal edges 14 and 15 which cooperate with rail 25. However, this notch 13 is not essential. The main purpose for including this notch 13 is to control the shape of the lower rear corner of the card so that the machine will be applicable for cards which are originally made with different corner constructions such as chamfered or radius corner cards as well as square corner cards. A further advantage of the notch 13 is that it provides operative edges 14 and 15 which are relatively protected from damage due to normal abuse to which the cards are subjected by normal operator handling. However, if corner damage is not a problem and if only square corner cards are contemplated, then the notch 13 may be omitted. This modification with the notch 13 omitted is illustrated in FIG. 7 which illustrates the same position as FIG. 1 and all of the corresponding elements have simply been increased by one hundred. All of the elements not shown in FIG. 7 are identical to the corresponding elements in FIG. 1.

Referring now to FIG. 7, the structural differences, in addition to the removal of the notch 13 from the card, include the redesigning of the rest platform 120 so that at least its rear end is capable of moving vertically so as to raise the entire pack of cards (replacing this particular function of the rail 25 which is illustrated in FIG. 2). Secondly, the rail 125 is relocated just behind the rear vertical edge 117 of the cards, but rail 125 is still capable of the same vertical movement as rail 25.

The operation of the FIG. 7 modification would be essentially identical to the earlier described operation with the following exceptions. The step of raising all of the cards which is illustrated in FIG. 2 in the first described embodiment would now be accomplished by raising at least the rear end of platform 20 (rather than the rail 25). The operation would then parallel that of the first described embodiment until the selected cards dropped relative to the non-selected cards (that is, the FIG. 4 position). At this time the platform 20 would have returned to its original position and the rail 125 will now have moved up to the dotted line position in FIG. 7 just to the rear of the cards and low enough to be immediately adjacent the lowered selected cards but beneath the lower rear corners of the still raised rejected cards. At this time the rail 125 would move forwardly as this procedure and the subsequent procedures would then be essentially the same as described above and illustrated with respect to FIGS. 5 and 6 of the first described embodiment.

One advantage of this modified embodiment is that it would simplify the overall method and apparatus by eliminating the need to punch out the notch 13.

Although the invention has been described in considerable detail with respect to a preferred embodiment thereof, it will be apparent that the invention is capable of numerous modifications and variations apparent to those skilled in the art without departing from the spirit and scope of the invention.

We claim:

1. An information storage card having a vertical rear edge which is arranged vertically in operation in a card sorting device, a plurality of uniform notches evenly spaced along the said vertical rear edge, tabs between said notches positioned to be removed to impart information to that card and hence to distinguish that card from other similar storage cards, a notch in the top of the card having a vertically extending abutment edge adapted to be engaged to prevent forward movement of that card, and a notch in the rear lower corner of the card at the bottom of the vertical rear edge, which notch includes a downwardly facing horizontal edge extending from said vertical rear edge of the card inwardly thereof adapted to be engaged for raising the card and a rearward facing vertical edge extending upwardly from the bottom of the card adapted to be engaged for moving the card horizontally forwardly.

* * * * *